United States Patent [19]

Machado

[11] Patent Number: 6,001,955

[45] Date of Patent: Dec. 14, 1999

[54] HIGH MODULUS POLYKETONES

[75] Inventor: Joseph Michael Machado, Ottignies Louvain-La-Neuve, Belgium

[73] Assignee: Shell Oil Company, Houston, Tex.

[21] Appl. No.: 09/153,112

[22] Filed: Sep. 15, 1998

[51] Int. Cl.[6] .................................................. C08G 4/00
[52] U.S. Cl. ............................ 528/220; 528/392; 525/471
[58] Field of Search .................................... 528/220, 392; 525/471

[56] References Cited

U.S. PATENT DOCUMENTS

| | | | |
|---|---|---|---|
| 3,625,877 | 12/1971 | Jackson, Jr. et al. | 260/24 |
| 4,348,497 | 9/1982 | Berghmans | 524/293 |
| 5,135,976 | 8/1992 | Van Helden et al. | 524/114 |
| 5,633,301 | 5/1997 | Moy et al. | 524/100 |

*Primary Examiner*—Duc Truong

[57] ABSTRACT

Thermoplastic compositions of polyketones having an increased flexural modulus are made by intermixing alternating aliphatic polyketones with a stiffening quantity of pentaerythritol.

16 Claims, No Drawings

HIGH MODULUS POLYKETONES

BACKGROUND OF THE INVENTION

Some polymer applications call for a high degree of stiffness (high flexural modulus). Examples include some film applications such as photographic film base and packaging material. One approach to obtain such stiff materials is to add fillers such as carbon or silica, or to incorporate fibers, such as glass and carbon fibers into a relatively flexible polymer, thereby forming a composite material. Unfortunately, composites are difficult to repair and recycle. These and other drawbacks can make composites unsuitable in a number of applications.

Polymers of carbon monoxide and ethylenically unsaturated hydrocarbons commonly referred to as aliphatic alternating polyketones (hereafter, "polyketones") are now well known. High molecular weight alternating aliphatic polyketones are of considerable interest because they exhibit a good overall set of physical and chemical properties. This class of polymers is disclosed in numerous U.S. patents assigned to Shell Oil Company exemplified by U.S. Pat. Nos. 4,880,903 and 4,880,904 which are incorporated herein by reference.

Stiffening polyketones has previously been attained through the formation of composites with the addition of materials such as various glasses and fibers. U.S. Patent No. 5,122,564 provides an example of this approach of the prior art. Stiffening polyketones without necessarily resorting to composite formations would help expand the range of applications for polyketones.

SUMMARY OF THE INVENTION

High modulus polyketone is obtained by the addition of a stiffening quantity of pentaerythritol (i.e., tetrakis (hydroxymethyl)methane) to polyketone polymer.

DETAILED DESCRIPTION

The polyketone polymers which are employed in this invention are of an alternating structure and contain substantially one molecule of carbon monoxide for each molecule of ethylenically unsaturated hydrocarbon. The portions of the polymer attributable to CO alternates with those attributable to the ethylenically unsaturated hydrocarbon.

It is possible to employ a number of different ethylenically unsaturated hydrocarbons as monomers within the same polymer but the preferred polyketone polymers are copolymers of carbon monoxide and ethylene or terpolymers of carbon monoxide, ethylene and a second ethylenically unsaturated hydrocarbon of at least 3 carbon atoms, particularly an α-olefin such as propene. Additional monomers can also be used and still come within the scope of polyketone polymers described herein. That is, polyketone polymers can be made from four, five, or more combinations of monomers. Such polyketone polymers are aliphatic in that there is an absence of aromatic groups along the polymer backbone. However, alternating polyketones may have aromatic groups substituted or added to side chains and yet still be considered alternating aliphatic polyketones.

When the preferred polyketone terpolymers are employed, there will be within the terpolymer at least about 2 units incorporating a moiety of ethylene for each unit incorporating a moiety of the second or subsequent hydrocarbon. Preferably, there will be from about 10 units to about 100 units incorporating a moiety of the second hydrocarbon. The polymer chain of the preferred polyketone polymers is therefore represented by the repeating formula

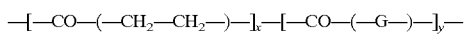

where G is the moiety of ethylenically unsaturated hydrocarbon of at least three carbon atoms polymerized through the ethyllenic unsaturation and the ratio of y:x is no more than about 0.5. When copolymers of carbon monoxide and ethylene are employed in the compositions of the invention, there will be no second hydrocarbon present and the copolymers are represented by the above formula wherein y is zero. When y is other than zero, i.e. terpolymers are employed, the —CO—(—CH$_2$—CH$_2$—)—units and the —CO—(—G)— units are found randomly throughout the polymer chain, and preferred ratios of y:x are from about 0.01 to about 0.1.The precise nature of the end groups does not appear to influence the properties of the polymer to any considerable extent so that the polymers are fairly represented by the formula for the polymer chains as depicted above.

Of particular interest are the polyketone polymers of number average molecular weight from about 1000 to about 200,000, particularly those of number average molecular weight from about 20,000 to about 90,000 as determined by gel permeation chromatography. The physical properties of the polymer will depend in part upon the molecular weight, whether the polymer is a copolymer or a terpolymer, and in the case of terpolymers the nature of the proportion of the second hydrocarbon present. Typical melting points for the polymers are from about 175° C. to about 300° C., more typically from about 210° C. to about 270° C. The polymers have a limiting viscosity number (LVN), measured in m-cresol at 60° C. in a standard capillary viscosity measuring device, of from about 0.5 dl/g to about 10 dl/g, more frequently of from about 0.8 dl/g to about 4 dl/g. The backbone chemistry of aliphatic polyketones precludes chain scission by hydrolysis. As a result, they generally exhibit long term maintenance of their property set in a wide variety of environments.

The production of polyketone polymers is described in U.S. Pat. Nos. 4,808,699 and 4,868,282 to van Broekhoven, et al which issued on Feb. 28, 1989 and Sep. 19, 1989 respectively, and are herein incorporated by reference. U.S. Pat. No. 4,808,699 teaches the production of linear alternating polymers by contacting ethylenically unsaturated compounds and carbon monoxide in the presence of a catalyst comprising a Group VIII metal compound, an anion of a nonhydrohalogenic acid with a pKa less than 6 and a bidentate phosphorous, arsenic or antimony ligand. U.S. Pat. No. 4,868,282 teaches the production of linear alternating terpolymers by contacting carbon monoxide and ethylene in the presence of one or more hydrocarbons having an ethylenically unsaturated group with a similar catalyst.

The high modulus polyketone of this invention is made by intermixing a stiffening quantity of pentaerythritol with polyketone. The pentaerythritol may be incorporated into the polyketone polymer at any stage of its processing. Any of the conventional methods suitable for forming an intimate mixture of the polymer and additive may be used to form the mixture so long as the method results in a substantially uniform blend of the composition components. A twin screw compounding extruder with injection capability is preferred. For example, a 30 mm Haake or 25mm Berstorff counter-rotating intermeshing extruder is suitable for this purpose.

A stiffening quantity of pentaerythritol is a quantity which will result in a significant increase in the tensile modulus of the polymer relative to the same polyketone polymer composition without pentaerythritol. Generally, this is an increase of about 10% or more, preferably about 15% or more, and most preferably at least 150%. In general, the desired increase in modulus of the polyketone composition is obtained by the addition of at least about 10% wt (based on total weight of polymer and pentaerythritol). Preferably, at least about 15% wt pentaerythritol is added. Most preferably, between about 15% and 40% wt is added.

The compositions of the invention may also contain other conventional polymer additives and which improve or otherwise alter the properties of the compositions such as: fillers, extenders, lubricants, pigments, stabilizers, impact modifiers, and other polymeric materials. Such additives may be added to the composition by blending or by other conventional methods.

The resulting thermoplastic composition can then be extruded, solvent-cast into a film, spun into fibers or filaments, or molded into a shaped object. Uses for such materials include stiff but breakable packaging such as those used to contain some medicine tablets.

The invention will be further illustrated by the following nonlimiting examples.

EXAMPLE 1 (Polyketone Formation)

A terpolymer of carbon monoxide, ethene, and propene was produced in the presence of a catalyst composition formed from palladium acetate, the anion of triflouroacetatic acid and 1,3-bis(diphenylphosphino)-propane. The melting point of the linear terpolymer was 220° C. and it had a limiting viscosity number (LVN) of 1.75 measured at 60° C. in m-cresol.

EXAMPLES 2–5 (Addition of Stiffening Agent)

The polymer of Example 1 was cryogenically ground in a Mikro Pulverizer. The cryoground polymer was then cooled with liquid nitrogen to form a coarse powder and tumblemixed with varying quantities of pentaerythritol (98% pure grade, obtained commercially from Aldrich Chemical Company) to form mixtures. The mixture were then melt mixed using a 30 mm Haake co-rotating twin screw extruder operating at 250 rpm at 250° C. This melt mixed combination was then injection molded using an Engell ES 250 molder to produce standard specimens for ASTM D790 tensile and flexural testing. Flexural modulus testing results are listed in the following table.

TABLE 1

| Example | Plasticizer Loading (Wt %) | Flexural Modulus (MPa) |
|---|---|---|
| 1 | 0 | 1786.0 |
| 2 | 5 | 1820.7 |
| 3 | 10 | 2048.3 |
| 4 | 20 | 2786.2 |
| 5 | 40 | 3400.0 |

This examples illustrates the improved stiffness attained through the addition of pentaerythritol to polyketone.

I claim as my invention:

1. A composition comprising alternating aliphatic polyketone and, intermixed therein, a stiffening quantity of pentaerythritol.

2. The composition of claim 1 comprising at least about 10% wt pentaerythritol (based on total weight of the composition).

3. The composition of claim 1 comprising at least about 15% wt pentaerythritol (based on total weight of the composition).

4. The composition of claim 1 comprising from 15 to 40 % wt pentaerythritol (based on total weight of the composition).

5. The composition of claim 1 having a flexural modulus of at least about 10% greater than polyketone without the addition of pentaerythritol.

6. The composition of claim 1 having a flexural modulus of at least about 15% greater than polyketone without the addition of pentaerythritol.

7. The composition of claim 1 having a flexural modulus of at least about 150% greater than polyketone without the addition of pentaerythritol.

8. A process for increasing the flexural modulus of polyketone comprising intermixing therewith a stiffening quantity of pentaerythritol.

9. The process of claim 8 wherein said stiffening quantity is at least about 10 % wt (based on total weight of polyketone and pentaerythritol).

10. The process of claim 8 wherein said stiffening quantity is at least about 15 % wt (based on total weight of polyketone and pentaerythritol).

11. The process of claim 8 wherein said stiffening quantity is about 15 to 40 % wt (based on total weight of polyketone and pentaerythritol).

12. A high modulus composition made by intermixing a polyketone and a stiffening quantity of pentaerythritol.

13. The composition of claim 12 wherein at least about 10% wt (based on total weight of composition) of pentaerythritol is intermixed with said polyketone.

14. The composition of claim 12 wherein at least about 150% wt (based on total weight of composition) of pentaerythritol is intermixed with said polyketone.

15. The composition of claim 12 wherein 15–40% wt (based on total weight of composition) of pentaerythritol is intermixed with said polyketone.

16. An article made according to the process of claim 8.

* * * * *

UNITED STATES PATENT AND TRADEMARK OFFICE
CERTIFICATE OF CORRECTION

PATENT NO. : 6,001,955
DATED : December 14, 1999
INVENTOR(S) : Machado

It is certified that error appears in the above-identified patent and that said Letters Patent is hereby corrected as shown below:

Column 2, line 6, delete "ethyllenic" and insert --ethylenic--

Column 3, line 8, after "additives" delete --and--

Signed and Sealed this

Thirtieth Day of May, 2000

Attest:

Q. TODD DICKINSON

*Attesting Officer*           *Director of Patents and Trademarks*